United States Patent
Gupta et al.

(10) Patent No.: US 9,826,570 B1
(45) Date of Patent: Nov. 21, 2017

(54) RADIO FREQUENCY RESOURCE MANAGEMENT BY PREPONING SCHEDULED ACTIVITIES

(71) Applicant: QUALCOMM Incorporated, San Diego, CA (US)

(72) Inventors: Ashutosh Gupta, Hyderabad (IN); Amandeep Singh Bedi, Hyderabad (IN); Ankit Banaudha, Hyderabad (IN); Pradeep Nandam, Hyderabad (IN); Harinath Reddy Patel, Mahabubnagar (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/396,129

(22) Filed: Dec. 30, 2016

(51) Int. Cl.
*H04W 4/00* (2009.01)
*H04W 76/06* (2009.01)
*H04L 29/06* (2006.01)
*H04W 8/18* (2009.01)
*H04W 76/04* (2009.01)
*H04W 88/06* (2009.01)

(52) U.S. Cl.
CPC ....... *H04W 76/068* (2013.01); *H04L 65/1016* (2013.01); *H04W 8/18* (2013.01); *H04W 76/046* (2013.01); *H04W 88/06* (2013.01)

(58) Field of Classification Search
CPC .. H04L 65/1016; H04W 8/18; H04W 76/046; H04W 88/06
USPC .......................... 455/435.1, 558, 433, 432.3
See application file for complete search history.

(56) References Cited

U.S. PATENT DOCUMENTS

| | | | | |
|---|---|---|---|---|
| 8,494,521 | B2 * | 7/2013 | Shi | H04L 65/1016 455/432.3 |
| 9,185,143 | B2 * | 11/2015 | Zhu | H04L 65/1063 |
| 9,351,193 | B2 * | 5/2016 | Raleigh | H04M 15/80 |
| 9,693,366 | B2 * | 6/2017 | Adjakple | H04W 12/08 |
| 2014/0086177 | A1 * | 3/2014 | Adjakple | H04W 12/08 370/329 |

* cited by examiner

*Primary Examiner* — Marceau Milord
(74) *Attorney, Agent, or Firm* — Foley & Lardner LLP (57) ABSTRACT

Apparatuses and methods for a wireless communication device having multiple Subscriber Identity Modules (SIMs) in which a first SIM is associated with an Internet Protocol (IP) Multimedia Subsystem (IMS) subscription that supports IMS services. The method includes but not limited to, determining that an IMS activity has completed at the IMS subscription, and determining whether a timer for a scheduled IMS signaling exceeds a time threshold. The timer indicates a time duration until performing the scheduled IMS signaling as scheduled. The method further includes, in response to determining that the timer does not exceed the time threshold, performing the scheduled IMS signaling and releasing a connection for the IMS subscription.

30 Claims, 6 Drawing Sheets

RADIO FREQUENCY RESOURCE MANAGEMENT BY PREPONING SCHEDULED ACTIVITIES

BACKGROUND

A wireless communication device, such as a mobile phone device or a smart phone, may include two or more Subscriber Identity Modules (SIMs). Each SIM may correspond to at least one subscription via one or more Radio Access Technologies (RATs). Such a wireless communication device may be a multi-SIM wireless communication device. In a Multi-SIM-Multi-Active (MSMA) wireless communication device, all SIMs may be active at the same time. In a Multi-SIM-Multi-Standby (MSMS) wireless communication device, if any one SIM is active, then the rest of the SIM(s) may be in a standby mode. The RATs may include, but are not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS) Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network.

A MSMS (e.g., a Dual-SIM-Dual-Standby (DSDS)) wireless communication device may have multiple subscriptions. In some cases, a first subscription may be utilized for Internet Protocol (IP) Multimedia Subsystem (IMS), providing services such as Voice-Over-LTE (VoLTE), Short Messaging Service (SMS), or Rich Communication Service (RCS). A second subscription may be a Designated Data Subscription (DDS) for data services. In this configuration, once an IMS activity (e.g., a VoLTE call, SMS, RCS) has completed at the IMS subscription, the wireless communication device may immediately release the connection (e.g., Radio Resource Control (RRC) connection) of the IMS subscription, rather than wait for the network to release the connection after detecting data inactivity of the wireless communication device (after 10 or 20 seconds based on data inactivity timer configured at the network). Occasionally, when the connection is just released, the IMS subscription may need to establish a connection again within few seconds for a scheduled IMS signaling, such as periodic IMS Registration/Subscribe/Publish request scheduled to be transmitted periodically. Substantial resources of the wireless communication device and the network may be consumed for reestablishing the connection and resuming the Signaling Radio Bearers (SRBs) and Data Radio Bearers (DRBs). At the same time, the DDS subscription loses the radio frequency (RF) resource of the wireless communication device, which is locked by the IMS subscription.

SUMMARY

Examples described herein relate to apparatuses and methods for preponing scheduled activities for a wireless communication device having multiple Subscriber Identity Modules (SIMs) in which a first SIM is associated with an Internet Protocol (IP) Multimedia Subsystem (IMS) subscription that supports IMS services. In some examples, the method comprises determining that an IMS activity has completed at the IMS subscription, determining whether a timer for a scheduled IMS signaling exceeds a time threshold, wherein the timer indicates a time left for performing the scheduled IMS signaling as scheduled, and in response to determining that the timer does not exceed the time threshold, performing the scheduled IMS signaling and releasing a connection for the IMS subscription.

In some examples, the method further comprises in response to determining that the timer exceeds the time threshold, releasing the connection for the IMS subscription.

In some examples, the IMS activity includes at least one of Rich Communication Service (RCS), Short Message Service (SMS), or Voice over Long-Term Evolution (VoLTE).

In some examples, the IMS activity is determined to have completed in response to transmitting or receiving an IMS message that terminates the IMS activity.

In some examples, the time threshold is a predefined value.

In some examples, the scheduled IMS signaling includes at least one of a Register request, Keep Alive Transport Control Protocol (TCP) packet, Subscribe Request, or Publish Request, that is scheduled to be transmitted periodically.

In some examples, releasing the connection includes transmitting a tracking area update (TAU) request to indicate completion of the IMS activity, and triggering the IMS subscription to transfer from a connected mode to an idle mode.

In some examples, releasing the connection includes changing an internal state machine for the IMS subscription from a connected mode to an idle mode.

In some examples, a second SIM of the wireless communication device is associated with a subscription designated for data services (DDS).

According to some example, the method comprises determining that an IMS activity has completed at the IMS subscription, determining whether a timer for a scheduled IMS signaling exceeds a time threshold, wherein the timer indicates a time left for performing the scheduled IMS signaling as scheduled, in response to determining that the timer does not exceed the time threshold, performing the scheduled IMS signaling, determining whether to retry the scheduled IMS signaling, and in response to determining to retry the scheduled IMS signaling, updating the timer.

In some examples, the method further comprises in response to determining not to retry the scheduled IMS signaling, releasing a connection for the IMS subscription.

In some examples, the method further comprises in response to determining that the timer exceeds the time threshold, releasing a connection for the IMS subscription.

In some examples, determining to retry the scheduled IMS signaling is in response to detecting a failure event in which an error message is received or no message is received responsive to the scheduled IMS signaling.

In some examples, updating the timer includes updating the timer according to a predefined waiting pattern that includes set intervals for waiting before retrying the scheduled IMS signaling.

In some examples, updating the timer includes updating the timer according to a first waiting pattern in response to detecting a first type of failure event in which an error message is received responsive to the scheduled IMS signaling, and updating the timer according to a second waiting pattern in response to detecting a second type of failure event in which no message is received responsive to the scheduled IMS signaling.

According to some examples, a wireless communication device comprises multiple Subscriber Identity Modules (SIMs) in which a first SIM is associated with an Internet Protocol (IP) Multimedia Subsystem (IMS) subscription that supports IMS services. The wireless communication device also comprises a memory configured to store a time threshold and to maintain a timer for a scheduled IMS signaling. The timer indicates a time left for performing the scheduled IMS signaling as scheduled. The wireless communication device further comprises a processor coupled to the multiple SIMs and the memory. The processor is configured to determine that an IMS activity has completed at the IMS subscription, determine whether the timer for the scheduled IMS signaling exceeds the time threshold, and in response to determining that the timer does not exceed the time threshold, perform the scheduled IMS signaling.

In some examples, the IMS activity includes at least one of Rich Communication Service (RCS), Short Message Service (SMS), or Voice over Long-Term Evolution (VoLTE).

In some examples, the processor is configured to determine that the IMS activity has completed in response to transmitting or receiving an IMS message that terminates the IMS activity.

In some examples, the time threshold is a predefined value.

In some examples, the scheduled IMS signaling includes at least one of a Register request, Keep Alive Transport Control Protocol (TCP) packet, Subscribe Request, or Publish Request, that is scheduled to be transmitted periodically.

In some examples, the wireless communication device of claim 16 further comprises a second SIM associated with a subscription designated for data services (DDS).

In some examples, the processor is further configured to release a connection for the IMS subscription after performing the scheduled IMS signaling.

In some examples, the processor is further configured to transmit a tracking area update (TAU) request to indicate completion of the IMS activity, and trigger the IMS subscription to transfer from a connected mode to an idle mode.

In some examples, the processor is further configured to change an internal state machine for the IMS subscription from a connected mode to an idle mode.

In some examples, wherein the processor is further configured to determine whether to retry the scheduled IMS signaling, and in response to determining to retry the scheduled IMS signaling, update the timer.

In some examples, the processor is further configured to release a connection for the IMS subscription in response to determining not to retry the scheduled IMS signaling.

In some examples, the processor is further configured to determine to retry the scheduled IMS signaling in response to detecting a failure event in which an error message is received or no message is received responsive to the scheduled IMS signaling.

In some examples, the processor is further configured to update the timer according to a predefined waiting pattern that includes set intervals for waiting before retrying the scheduled IMS signaling.

In some examples, the processor is further configured to update the timer according to a first waiting pattern in response to detecting a first type of failure event in which an error message is received responsive to the scheduled IMS signaling, and update the timer according to a second waiting pattern in response to detecting a second type of failure event in which no message is received responsive to the scheduled IMS signaling.

According to some examples, a non-transitory computer-readable medium has processor-readable instruction such that, when executed, causes a processor to perform a method for a wireless communication device having multiple Subscriber Identity Modules (SIMs) in which a first SIM is associated with an Internet Protocol (IP) Multimedia Subsystem (IMS) subscription that supports IMS services. The method comprises determining that an IMS activity has completed at the IMS subscription, determining whether a timer for a scheduled IMS signaling exceeds a time threshold, wherein the timer indicates a time left for performing the scheduled IMS signaling as scheduled, and in response to determining that the timer does not exceed the time threshold, performing the scheduled IMS signaling and releasing a connection for the IMS subscription.

In some examples, the method further comprises in response to determining that the timer exceeds the time threshold, releasing the connection for the IMS subscription.

BRIEF DESCRIPTION OF THE DRAWINGS

The accompanying drawings, which are incorporated herein and constitute part of this specification, illustrate exemplary examples of the disclosure, and together with the general description given above and the detailed description given below, serve to explain the features of the various examples.

DETAILED DESCRIPTION

Various examples will be described in detail with reference to the accompanying drawings. Wherever possible, the same reference numbers may be used throughout the drawings to refer to the same or like parts. Different reference numbers may be used to refer to different, same, or similar parts. References made to particular examples and implementations are for illustrative purposes, and are not intended to limit the scope of the disclosure or the claims.

A modern communication device, referred to herein as a wireless communication device, User Equipment (UE), or Mobile Station (MS), may include one or more of cellular telephones, smart phones, personal or mobile multi-media players, personal data assistants, laptop computers, personal computers, tablet computers, smart books, palm-top computers, wireless electronic mail receivers, multimedia Internet-enabled cellular telephones, wireless gaming controllers, and similar personal electronic devices. Such a wireless communication device may include at least one Subscriber Identity Module (SIM), a programmable processor, memory, and circuitry for connecting to two or more mobile communication networks.

A wireless communication device may include one or more SIMs that provide access to one or multiple separate mobile communication networks. The access to mobile communication networks may be facilitated by Radio Access Technologies (RATs). The wireless communication device may be configured to connect to one or more base stations via one or more RATs. Examples of RATs may include, but not limited to, Frequency Division Multiple Access (FDMA), Time Division Multiple Access (TDMA), Code Division Multiple Access (CDMA) (particularly, Evolution-Data Optimized (EVDO)), Universal Mobile Telecommunications Systems (UMTS) (particularly, Time Division Synchronous CDMA (TD-SCDMA or TDS), Wideband Code Division Multiple Access (WCDMA), Long Term Evolution (LTE), High-Speed Downlink Packet Access (HSDPA), and the like), Global System for Mobile Communications (GSM), Code Division Multiple Access 1× Radio Transmission Technology (1×), General Packet Radio Service (GPRS), Wi-Fi, Personal Communications Service (PCS), and other protocols that may be used in a wireless communications network or a data communications network. Each RAT may be associated with a subscription or SIM.

A wireless communication device provided with a plurality of SIMs and connected to two or more networks with one SIM being active at a given time is a Multi-SIM-Multi-Standby (MSMS) communication device. In one example, the MSMS communication device may be a Dual-SIM-Dual-Standby (DSDS) communication device, which may include two SIMs that may both be active on standby, but one is deactivated when the other one is in use. In another example, the MSMS communication device may be a Triple-SIM-Triple-Standby (TSTS) communication device, which includes three SIMs that may all be active on standby, where two may be deactivated when a third one is in use. In other examples, the MSMS communication device may be other suitable multi-SIM communication devices, with, for example, four or more SIMs, such that when one is in use, the others may be deactivated.

On the other hand, a wireless communication device that includes a plurality of SIMs and connects to two or more networks with two or more SIMs being active at a given time may be a MSMA communication device. An example MSMA communication device may be a Dual-SIM-Dual-Active (DSDA) communication device, which may include two SIM. Both SIMs may remain active. In another example, the MSMA device may be a Triple-SIM-Triple-Active (TSTA) communication device, which may include three SIM. All three SIMs may remain active. In other examples, the MSMA communication device may be other suitable multi-SIM communication devices with four or more SIMs, all of which may be active.

Examples described herein relate to saving resources for a Multi-SIM-Multi-Standby (MSMS) wireless communication device, which has a first subscription for Internet Protocol (IP) Multimedia Subsystem (IMS) and a second subscription designated for data services (DDS). The IMS may enable IMS services such as, but not limited to Voice-Over-LTE (VoLTE), Video Technology (VT), Short Messaging Services (SMS), Rich Communication Services (RCS), File To Protocol (FTP) services, video sharing services, and/or the like. In some examples, when an IMS activity (e.g., a VoLTE call) has completed on the IMS subscription, the wireless communication device may perform any IMS signaling scheduled to happen within a short interval of time (e.g., a few seconds) before releasing the connection (e.g., Radio Resource Control (RRC) connection) of the IMS subscription.

As used herein, the terms "SIM," "SIM card," and "subscriber identification module" may be used interchangeably to refer to a memory that may be an integrated circuit or embedded into a removable card, and that stores an International Mobile Subscriber Identity (IMSI), related key, and/or other information used to identify and/or authenticate a wireless device on a network and enable communication services with the network. Because the information stored in a SIM may be the wireless device to establish a communication link for a particular communication service with a particular network, the term "SIM" may also be used herein as a shorthand reference to the communication service (e.g., the networks, the subscriptions, the services, and/or the like) associated with and enabled by the information (e.g., in the form of various parameters) stored in a particular SIM as the SIM and the communication network, as well as the services and RATs supported by that network, correlate to one another.

Figure 1:
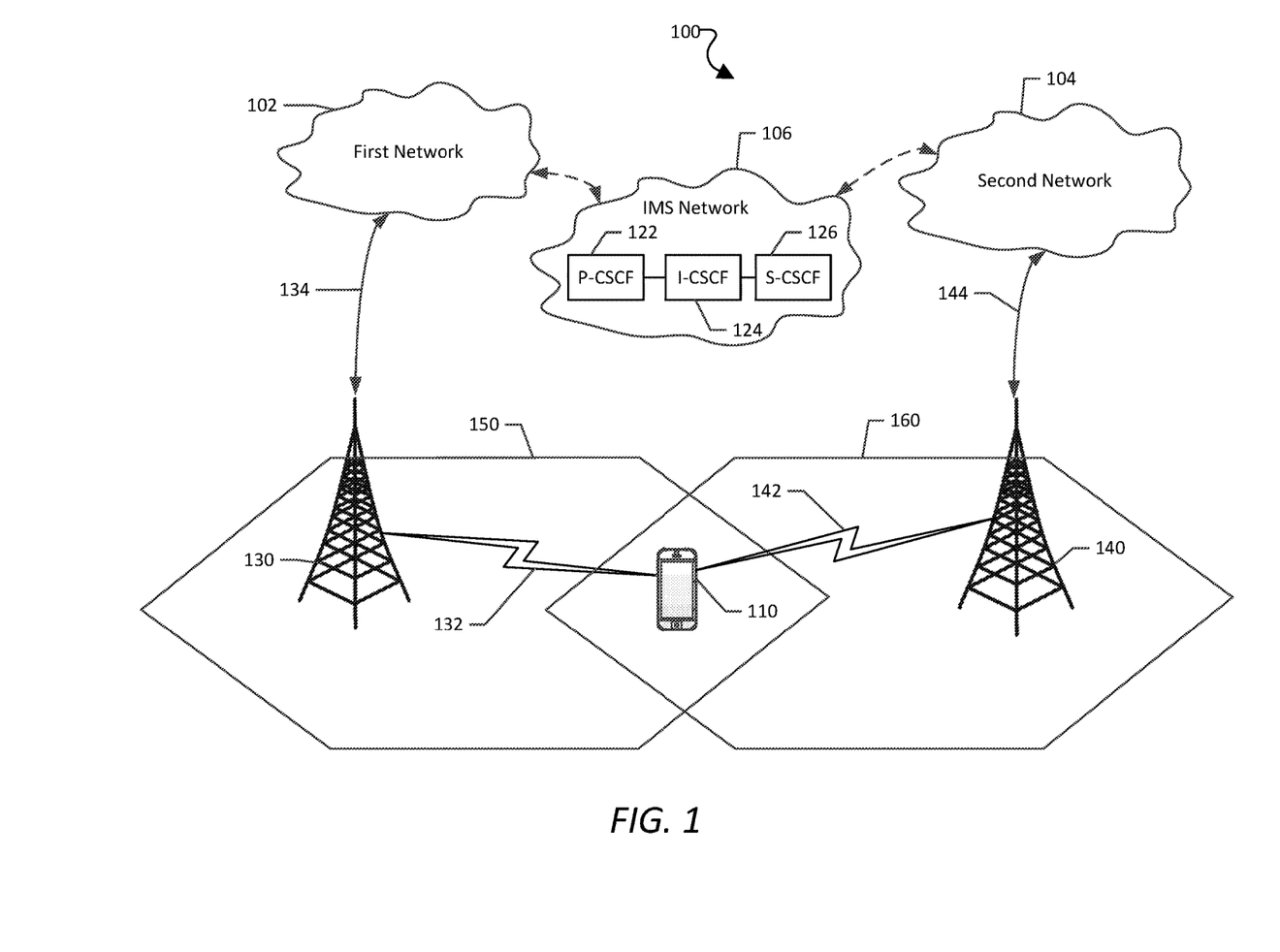
FIG. 1 is a schematic diagram of a communication system in accordance with various examples.

Various examples may be implemented within a communication system 100, an example of which is illustrated in FIG. 1. Referring to FIG. 1, a first network 102 (e.g., a first mobile network) and second network 104 (e.g. a second mobile network) may each associate with a plurality of cellular base stations. For instance, a first base station 130 may provide the first network 102 in a first serving cell 150. A second base station 140 may provide the second network 104 in a second serving cell 160. Illustrating with a non-limiting example, one or more of the first mobile network 102 and the second mobile network 104 may be connected to an IMS network 106. The IMS network 106 may include various IMS servers for providing session and media control, such as but not limited to, one or more Proxy Call Session Control Function (CSCF) (P-CSCF) 122, one or more Interrogating CSCF (I-CSCF) 124, and one or more Serving CSCF (S-CSCF) 126. A wireless communication device 110 may be associated with (within effective boundaries of) the first serving cell 150 and the second serving cell 160.

The first base station 130 may be in communication with the first network 102 over a wired or wireless connection 134. The second base station 140 may be in communication with the second network 104 over a wired or wireless connection 144. The wireless communication device 110 may be in communication with the first network 102 through a first cellular connection 132 to the first base station 130. The first cellular connection 132 may correspond to a first RAT on a first subscription (e.g., over a first SIM) of the wireless communication device 110. The wireless communication device 110 may be in communication with the second network 104 through a second cellular connection 142 to the second base station 140. The second cellular connection 142 may correspond to a second RAT on a second subscription (e.g., over a second SIM) of the wireless communication device 110.

Each of the first cellular connection 132 and second cellular connection 142 may be two-way wireless communication links. Examples of each of the first RAT and second RAT may include, but not limited to, FDMA, TDMA, CDMA (e.g., EVDO), UMTS (e.g., TDS, WCDMA, LTE, HSDPA, or the like), GSM, 1×, GPRS, Wi-Fi, PCS, and/or another protocol used in a wireless communications network or a data communications network. By way of illustrating with a non-limiting example, the first RAT (employed by the cellular connection 132) may be LTE that can enable VoLTE services. The second RAT (employed by the second cellular connection 142) may be LTE that can enable Packet Switching (PS) services.

Each of the first base station 130 and the second base station 140 may include at least one antenna group or transmission station located in the same or different areas. The at least one antenna group or transmission station may be associated with signal transmission and reception. Each of the first base station 130 and the second base station 140 may include one or more processors, modulators, multiplexers, demodulators, demultiplexers, antennas, and the like for performing the functions described herein. In some examples, each of the first base station 130 and the second base station 140 may be an access point, Node B, evolved Node B (eNodeB or eNB), base transceiver station (BTS), or the like.

In various examples, the wireless communication device 110 may be configured to access the first network 102 and the second network 104 by virtue of the multi-SIM and/or multi-mode SIM configuration of the wireless communication device 110. When a SIM corresponding to a subscription is inserted, the wireless communication device 110 may access the mobile communication network associated with that subscription based on the information stored on the SIM through registrations and call setups.

The wireless communication device 110 may be in communication with the IMS network 106 via the first network 102 and/or the second network 104. The IMS may enable convergence of voice, text, and multimedia services over an all-IP network and support VoLTE, SMS, RCS, and/or the like. The IMS may use Session Initiation Protocol (SIP) for negotiating and establishing a media session (e.g., a VoLTE call) between two IP addresses. Using IMS and SIP, the wireless communication device 110 can exchange text, voice, and/or multimedia packet switched (PS) communication with the IMS network 106 via the first base station 130 and/or the second base station 140. The wireless communication device 110 may operate in a connected mode to actively communicate with the IMS network 106. Alternatively, the wireless communication device 110 may operate in an idle mode and camp on the IMS network 106 if active communication is not needed.

The IMS network 106 may include network entities (e.g., IMS servers) for session management and routing, service support, databases, and interworking. In various examples, Call Session Control Function (CSCF) is responsible for establishing, monitoring, supporting, and releasing multimedia sessions. CSCF may include one or more P-CSCF 122, one or more I-CSCF 124, and one or more S-CSCF 126, which may be implemented in one physical entity or in separate physical entities. The P-CSCF 122 is the initial point of contact for the wireless communication device 110, which handles requests from the wireless communication device 110 and is the "proxy" to the entire IMS. The P-CSCF 122 may include a Policy Control Function (PCF) for enforcing Quality of Service (QoS) policies on media. The I-CSCF 124 is a liaison between the wireless communication device 110 (via the P-CSCF 122) and the S-CSCF 126, which assigns the wireless communication device 110 to the S-CSCF 126 during registration. The S-CSCF 126 is a decision point as to whether the messages from the wireless communication device 110 will be forwarded to application servers.

In some examples, the wireless communication device 110 may establish a wireless connection with a peripheral device (not shown) used in connection with the wireless communication device 110. For example, the wireless communication device 110 may communicate over a Bluetooth® link with a Bluetooth-enabled personal computing device (e.g., a "smart watch"). In some examples, the wireless communication device 110 may establish a wireless connection with a wireless access point (not shown), such as over a Wi-Fi connection. The wireless access point may be configured to connect to the Internet or another network over a wired connection.

Figure 2:
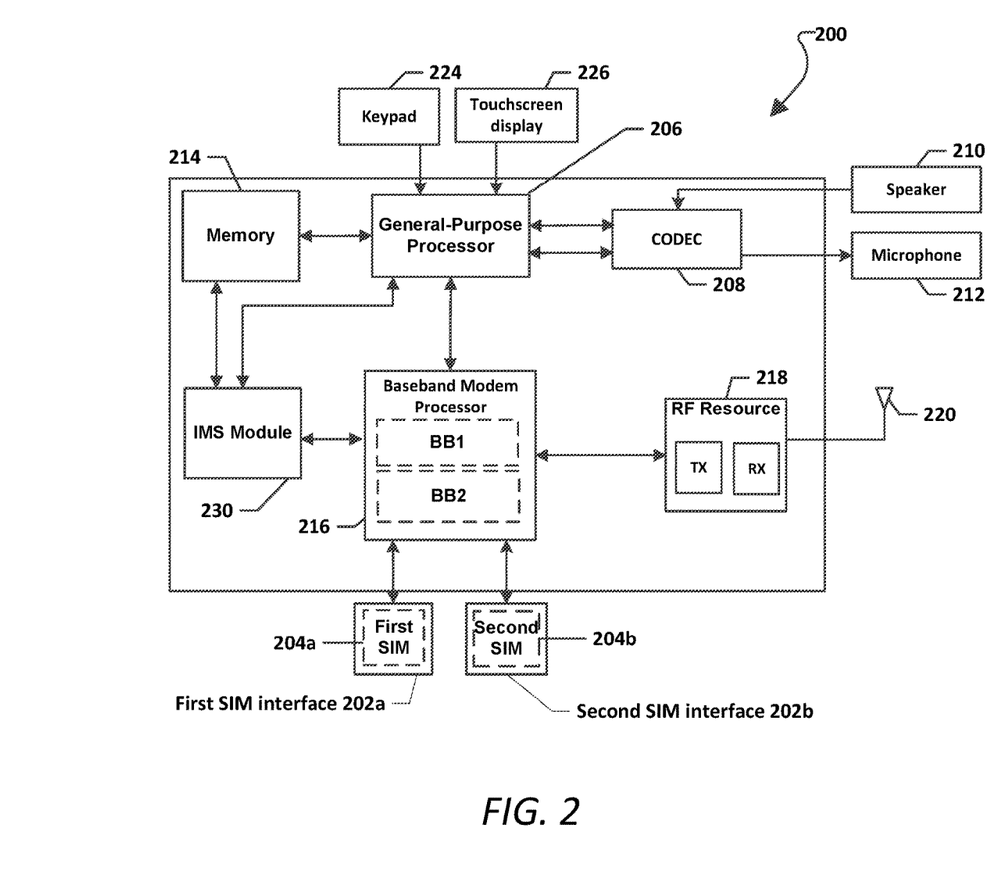
FIG. 2 is a component block diagram of a wireless communication device according to various examples.

FIG. 2 is a functional block diagram of a wireless communication device 200 suitable for implementing various examples. The wireless communication device 200 may be the wireless communication device 110 as described with reference to FIG. 1. Referring to FIGS. 1-2, the wireless communication device 200 may include a first SIM interface 202a, which may receive or otherwise include a first SIM 204a that is associated with the first network 102. The wireless communication device 200 may include a second SIM interface 202b, which may receive or otherwise include a second SIM 204b that is associated with the second network 104. In various examples, the first SIM 204a is utilized for IMS while the second SIM 204b is designated for data services.

A SIM (e.g., the first SIM 204a, the second SIM 204b, or the like) in various examples may be a Universal Integrated Circuit Card (UICC) that is configured with SIM and/or Universal SIM (USIM) applications, enabling access to GSM and/or UMTS networks. The UICC may also provide storage for a phone book and other applications. Alternatively, in a CDMA network, a SIM may be a UICC removable user identity module (R-UIM) or a CDMA Subscriber Identity Module (CSIM) on a card. A SIM card may have a Central Processing Unit (CPU), Read Only Memory (ROM), Random Access Memory (RAM), Electrically Erasable Programmable Read-Only Memory (EEPROM) and Input/Output (I/O) circuits. An Integrated Circuit Card Identity (IC-CID) SIM serial number may be printed on the SIM card for identification. However, a SIM may be implemented within a portion of memory of the wireless communication device 200, and thus need not be a separate or removable circuit, chip, or card.

A SIM used in various examples may store user account information, an IMSI, a set of SIM Application Toolkit (SAT) commands, and other network provisioning information, as well as provide storage space for phone book database of the user's contacts. As part of the network provisioning information, a SIM may store home identifiers (e.g., a System Identification Number (SID)/Network Identification Number (NID) pair, a Home Public Land Network (HPLMN) code, etc.) to indicate the SIM card network operator provider.

The wireless communication device 200 may include at least one controller, such as a general-purpose processor 206, which may be coupled to a coder/decoder (CODEC) 208. The CODEC 208 may in turn be coupled to a speaker 210 and a microphone 212. The general-purpose processor 206 may also be coupled to at least one memory 214. The general-purpose processor 206 may include any suitable data processing device, such as a microprocessor. In the alternative, the general-purpose processor 206 may be any suitable electronic processor, controller, microcontroller, or state machine. The general-purpose processor 206 may also be implemented as a combination of computing devices (e.g., a combination of a Digital Signal Processor (DSP) and a microprocessor, a plurality of microprocessors, at least one microprocessor in conjunction with a DSP core, or any other such configuration).

The memory 214 may include a non-transitory processor-readable storage medium that stores processor-executable instructions. For example, the instructions may include routing communication data relating to the first or second SIM though a corresponding baseband-RF resource chain. The memory 214 may include any suitable internal or external device for storing software and data. Examples of the memory 214 may include, but are not limited to, RAM, ROM, floppy disks, hard disks, dongles or other Recomp Sensor Board (RSB) connected memory devices, or the like. The memory 214 may store an Operating System (OS), user application software, and/or executable instructions. The memory 214 may also store application data, such as an array data structure.

The general-purpose processor 206 and the memory 214 may each be coupled to baseband modem processor 216. The SIMs (e.g., the first SIM 204a, the second SIM 204b, and/or the like) in the wireless communication device 200 may be associated with at least one baseband-RF resource chain. A baseband-RF resource chain may include the baseband modem processor 216, which may perform baseband/modem functions for communications over the SIMs 204a and 204b. The baseband modem processor 216 may include or may be otherwise coupled to one or more amplifiers and radios, referred to generally herein as RF resource 218 or RF chain.

The RF resource 218 may include at least one transceiver that perform transmit/receive functions for the associated SIMs 204a and 204b of the wireless communication device 200. The RF resource 218 may include separate transmit and receive circuitries, or may include a transceiver that combines transmitter and receiver functions. The RF resource 218 may be coupled to a wireless antenna 220. The RF resource 218 may also be coupled to the baseband modem processor 216.

The examples described herein may be applicable to wireless communication devices in which the SIMs 204a and 204b share a common set of RF resource (particularly, the RF resource 218). Examples described herein may be applicable to wireless communication devices in which each of the SIMs 204a and 204b has a separate RF resource, but activities of one of the SIMs 204a and 204b may be deactivated while the other one of the SIMs 204a and 204b is active. When an IMS activity (e.g., VoLTE, SMS, RCS, etc.) is being performed through the first SIM 204a (associated with the IMS subscription), the RF resource 218 may be locked during the performance of the IMS activity. For example, upon access signaling of the IMS activity, the RF resource 218 may be locked from then onwards and may not be accessed by the second SIM 204b (associated with the DDS subscription). Illustrating with a non-limiting example, the access signaling may include SIP packets associated with Invite, which is a request to establish a media session, Message, which is a request to or a response from an IMS server, Register, which is a request to register for the IMS network, Subscribe, which is a request for network capability polling, and Publish, which is a request for status/event publication. When the IMS activity is completed, the RF resource 218 can be released from the IMS subscription and used by the DDS subscription.

In some examples, the general-purpose processor 206, the memory 214, the baseband modem processor 216, and the RF resource 218 may be included in the wireless communication device 200 as a system-on-chip. In some examples, the SIMs 204a and 204b and their corresponding interfaces 202a, 202b may be external to the system-on-chip. Further, various input and output devices may be coupled to components on the system-on-chip, such as interfaces or controllers. Example user input components suitable for use in the wireless communication device 200 may include, but are not limited to, a keypad 224, a touchscreen display 226, and the microphone 212.

In some examples, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive a selection of a contact from a contact list or to receive a telephone number. As another example, the request to initiate the outgoing call may be in the form of a voice command received via the microphone 212. Interfaces may be provided between the various software modules and functions in the wireless communication device 200 to enable communication between them.

The wireless communication device 200 may include an IMS module 230. The IMS module 230 may include devices and/or software that facilitate IMS services for the wireless communication device 200. In various examples, the IMS module 230 may include IMS applications, such as but not limited to VoLTE application, SMS application, and RCS application. The IMS module 230 may include a VoLTE/Video Framework, which provides an interface between IMS applications and lower level media carrier protocols and provides compression/decompression, encryption/decryption, and other functions for processing application data. The IMS module 230 may include an IMS stack, which includes protocols defined in the IMS standard, such as but not limited to SIP, Session Description Protocol (SDP), Real Time Protocol (RTP), RTP Control Protocol (RTCP), Real Time Streaming Protocol (RTSP), Message Session Relay Protocol (MSRP), and/or the like. The IMS module 230 may include a SIP user agent (UA), which can transmit and receive SIP messaging. The SIP UA can provide typical telephony functionality, such as dial, answer, hold, transfer, and so on. It should be understood that the IMS module 230 may include more, fewer, or different devices/software than what is discussed herein.

In some examples, the IMS module 230 may be implemented within the general-purpose processor 206. For example, the IMS module 230 may be implemented as software stored within the memory 214 and executed by the general-purpose processor 206. Accordingly, such examples can be implemented with minimal additional hardware costs. However, other examples relate to systems and processes implemented with dedicated hardware specifically configured for performing operations described herein with respect to the IMS module 230. For example, the IMS module 230 may be implemented as a separate processing component (i.e., separate from the general-purpose processor 206). In yet other examples, a portion of the IMS module 230 may be implemented within the general-purpose processor 206 and the rest may be implemented with dedicated hardware. The IMS module 230 may be coupled to the memory 214, the general processor 206, the baseband processor 216, and/or the RF resource 218 for performing the function described herein.

Hardware and/or software for the functions may be incorporated in the wireless communication device 200 during manufacturing, for example, as a part of a configuration of an original equipment manufacturer (OEM) of the wireless communication device 200. In further examples, such hardware and/or software may be added to the wireless communication device 200 post-manufacture, such as by installing one or more hardware devices and/or software applications onto the wireless communication device 200.

In some examples, the wireless communication device 200 may include, among other things, additional SIM cards, SIM interfaces, at least another RF resource associated with the additional SIM cards, and additional antennas for connecting to additional networks.

Figure 3:
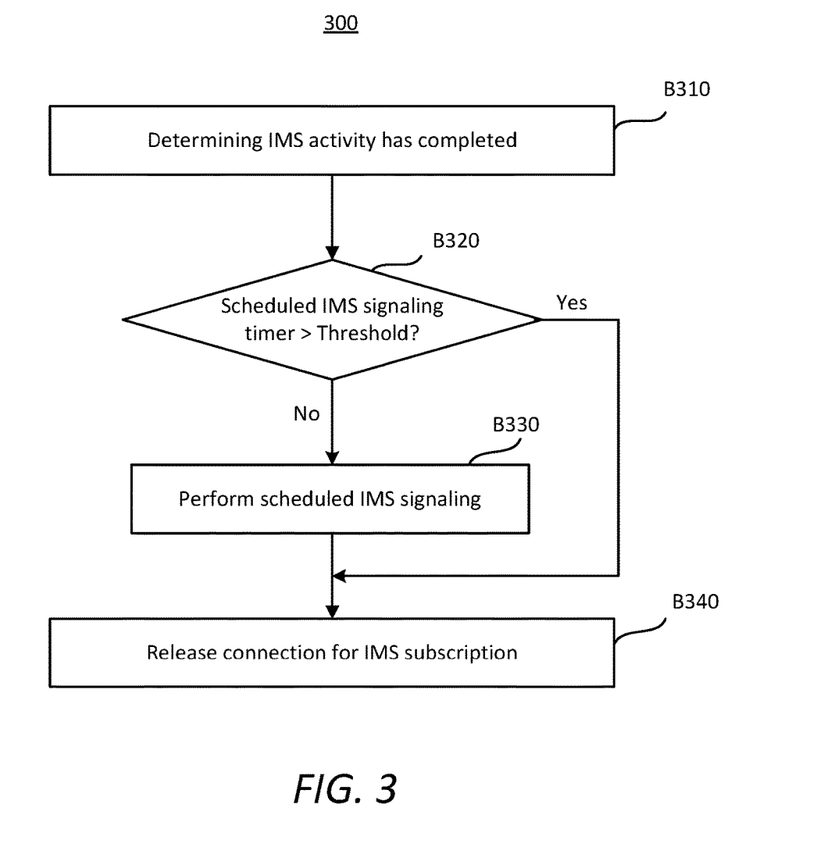
FIG. 3 is a process flowchart diagram illustrating a method for preponing a scheduled IMS activity according to various examples.

FIG. 3 is a process flowchart diagram illustrating a method 300 for preponing scheduled IMS activities according to various examples. Referring to FIGS. 1-3, the IMS module 230 or the general-purpose processor 206 may be adapted or may be otherwise capable of performing the method 300 in some examples.

At block B310, the IMS module 230 or the general-purpose processor 206 may determine that an IMS activity has completed at the IMS subscription. When an IMS activity (e.g., VoLTE call, SMS, RCS, etc.) is being performed at the IMS subscription (e.g., associated with the first SIM 204a), the RF resource 218 is locked for the connection (e.g., RRC connection) of the IMS subscription and may not be accessed by the DDS subscription (e.g., associated with the second SIM 204b). In various examples, the IMS module 230 or the general-purpose processor 206 may determine that the IMS activity has completed upon transmitting and/or receiving corresponding SIP messaging. For example, when a VoLTE call ends, a SIP request of Bye, which terminates a call, may be sent by either the calling or the called party. It should be understood that any suitable approach of determining that the IMS activity has completed can be employed.

At block B320, the IMS module 230 or the general-purpose processor 206 may determine whether a timer for a scheduled IMS signaling exceeds a time threshold. The timer indicates a time left for performing the scheduled IMS signaling as scheduled. According to the IMS specification, IMS signaling can be scheduled to be transmitted periodically in order to refresh the IMS session and/or subscription, which includes for example, periodic Register request, Keep Alive Transport Control Protocol (TCP) packet, Subscribe/Publish request, etc.

In some examples, the scheduled IMS signaling includes periodic IMS Register requests. The IMS network 106 may provide a validity period (e.g., 240 seconds) of the SIP registration of the wireless communication device 200 with the S-CSCF 126 of the IMS network 106. Once the wireless communication device 200 is assigned to the S-CSCF 126, the wireless communication device 200 may send REGISTER request again to the P-CSCF 122 upon lapse of half of the validity period (e.g., 120 seconds), to indicate that the wireless communication device 200 is still registered. Without such periodic Register message, the S-CSCF 126 may assume that the wireless communication device 200 has been disconnected. In various examples, the IMS module 230 or the general-purpose processor 206 maintains a Registration timer in the memory 214 to indicate the time left for sending the next Registration request as scheduled. The timer may be triggered when the wireless communication device 200 receives an initial ACK message acknowledging acceptance of the initial Register request. Then when the Registration timer reaches zero (0), the wireless communication device 200 may send a refreshing Registration request to the P-CSCF 122 to keep the registration valid. Upon this request is accepted, the timer may be reset as half of the validity period of the registration and triggered.

In some examples, the scheduled IMS signaling includes periodic Keep Alive TCP packets. The wireless communication device 200 may send a Keep Alive TCP probe packet every interval of time (e.g., 15 minutes) to the IMS network 106 to indicate the validity of sockets used for IMS connect. In some examples, the Keep Alive TCP probe packet has no data in it and has an ACK flag which is turned on. Without receiving the Keep Alive TCP probe packet, the IMS network 106 may assume that the IMS connect sockets are invalid and the wireless communication device 200 has been disconnected. In various examples, the IMS module 230 or the general-purpose processor 206 maintains a KeepAlive timer in the memory 214 to indicate the time left for sending the next Keep Alive TCP probe packets. The timer may be triggered upon detecting no TCP packet is exchanged with the wireless communication device 200. Then when the KeepAlive timer reaches zero (0), the wireless communication device 200 may send a Keep Alive TCP probe packet to the IMS network 106. Upon this packet is detected, the timer may be reset and triggered.

In some examples, the scheduled IMS signaling includes periodic Subscribe and/or Publish requests. A user of the wireless communication device 200 may intend to monitor the availability status of his/her contacts and/or a specific event (e.g., a callback event, an update to a contact list, a message waiting indicator) of a contact. The wireless communication device 200 may send a Subscribe request to the IMS network 106, asking to be notified of the current resource state and/or update of resource state (e.g., the availability status of contacts, the specific event) of contact(s). If the Subscribe request is accepted, the wireless communication device 200 is registered for notification. The contact may publish its current resource state and/or update of resource state by sending the IMS network 106 a Publish request periodically and/or upon occurrence of a specific event. An IMS server may match the publisher(s) with the subscriber(s) and notify the subscriber(s) that have subscribed to the resource state of the publisher(s). The wireless communication device 200 can be both a subscriber and a publisher, sending Subscribe requests in some occasions and Publish requests in others.

A Subscribe request may include an expiry value indicating the validity period of the subscription. In order to keep the subscription valid beyond the duration, the wireless communication device 200 may resend a refreshing subscription request on a periodic basis before the subscription expires. In various examples, the IMS module 230 or the general-purpose processor 206 maintains a Subscribe timer in the memory 214 to indicate the time left for the subscription to expire. The timer may be triggered when the wireless communication device 200 receives an initial ACK message acknowledging acceptance of the initial Subscribe request. Then when the Subscription timer reaches zero (0), the wireless communication device 200 may send a new Subscribe request to the IMS network 106 to keep the subscription valid. Upon this request is accepted, the timer may be reset and triggered. In some examples, the wireless communication device 200 may have multiple subscriptions, for example, a subscription to the availability status of a contact and a subscription to a specific event of the contact. The IMS module 230 or the general-purpose processor 206 may maintain multiple Subscription timers in the memory 214, each corresponding to one subscription.

As discussed above, the wireless communication device 200 may also be a publisher, sending periodic Publish requests to publish the current resource state and/or update of resource state every interval of time (e.g., from a few minutes to a couple of hours). In various examples, the IMS module 230 or the general-purpose processor 206 maintains a Publish timer in the memory 214 to indicate the time left for sending the next Publish request. The timer may be triggered when the wireless communication device 200 receives an initial ACK message acknowledging acceptance of the initial Publish request. Then when the Publish timer reaches zero (0), the wireless communication device 200 may send a new Publish Request to the IMS network 106. Upon this request is accepted, the timer may be reset and triggered. It should be understood that the Registration request, Keep Alive TCP packet, Subscribe request, and Publish request are discussed herein as illustrating examples. The scheduled IMS signaling may include any other IMS messages scheduled to be transmitted.

In various examples, the time threshold may be a predefined value (e.g., 5 seconds, 10 seconds, 15 seconds) stored in the memory 214. The value may be chosen based on, for example but not limited to, tests and/or past experiences for achieving an effective resource saving. In further examples, a user of the wireless communication device 200 may change the value of the time threshold using the keypad 224 and/or the touchscreen display 226. In some examples, the IMS module 230 or the general-purpose processor 206 may maintain multiple timers for various scheduled IMS signaling, and each of the timers may be compared with the time threshold.

In response to determining that the timer for the scheduled IMS signaling exceeds the time threshold (B320: Yes), the IMS module 203 or the general-purpose processor 206 may release the connection (e.g., the RRC connection) at the IMS subscription, at block B340. Rather than waiting for the IMS network 106 to release the connection after detecting data inactivity of the wireless communication device 200 (after 10 or 20 seconds based on data inactivity timer configured at the IMS network 106), the wireless communication device 200 may immediately release the connection for the IMS subscription. As such, the DDS subscription of the wireless communication device 200 can utilize the RF resource 218 that would otherwise be locked by the IMS subscription in waiting for the IMS network 106 to release the connection.

In some examples, the IMS module 203 or the general-purpose processor 206 may transmit a tracking area update (TAU) request message with a particular indicator (e.g., an activity flag) to indicate the completion of the IMS activity and to initiate a TAU procedure to trigger the transfer to idle mode. In this case, the TAU request message may include an indicator (e.g., Active_Flag=0) to indicate that the IMS activity associated with the IMS subscription has completed. In other examples, the IMS module 203 or the general-purpose processor 206 may release the connection by changing an internal state machine for the IMS subscription from the connected mode to the idle mode, without transmitting the TAU request message. After the connection of the IMS subscription is released, the RF resource 218 is available to perform activities of the DDS subscription.

In response to determining that the timer for the scheduled IMS signaling does not exceed the time threshold (B320: No), the IMS module 203 or the general-purpose processor 206 may perform the scheduled IMS signaling, at block B330. For example, if the time threshold is 10 seconds and a pending request (e.g., a Register request, Keep Alive TCP probe packet, Subscribe request, Publish request) is scheduled within a time period shorter than or the same as 10 seconds, the pending request may be transmitted. In various examples, the timer may be reset and triggered for a next IMS signaling. After the scheduled IMS signaling is performed at block B330, the IMS module 203 or the general-purpose processor 206 may release the connection for the IMS subscription, at block B340, as discussed above.

As described, the method 300 can effectively save resources for the wireless communication device 200, the first network 102, and the IMS network 106. The IMS signaling pending within a short period of time (e.g., a few seconds) is performed right after the VoLTE call or SMS delivery ends, using the same RRC connection. It is avoided to reestablish the RRC connection and resume the Signaling Radio Bearers (SRBs) and Data Radio Bearers (DRBs) in the short period of time, which may consume substantial resources. In particular, in reestablishing the RRC connection, the wireless communication device 200 and the IMS network 106 need to exchange various messages via the first network 102 for registration, security establishment, and radio bearer setup. During the RRC connection reestablishment, the DDS subscription of the wireless communication device 200 may not access the RF resource 218, which is locked by the IMS subscription. Thus, time can be saved when the same RRC connection and radio bearers are used for the pending IMS signaling, and the DDS subscription may have more time utilizing the RF resource 218 if desired. In addition, Ping-Pong of the RF resource 218 between the IMS subscription and the DDS subscription can be prevented from happening too frequently.

Furthermore, preponing scheduled IMS signaling by a short period of time (e.g., a few seconds) does not harm functionality of the DDS subscription or the IMS subscription. When the VoLTE call at the IMS subscription continues for more than five seconds, Radio Link Failure (RLF) may be declared on the DDS subscription, which enters Out of Service (OOS) recovery procedure. If the RF resource 218 remains with the IMS subscription for a bit more time to perform the pending IMS signaling, it does not affect the DDS subscription which has entered the OOS recovery mode.

Figure 4A:
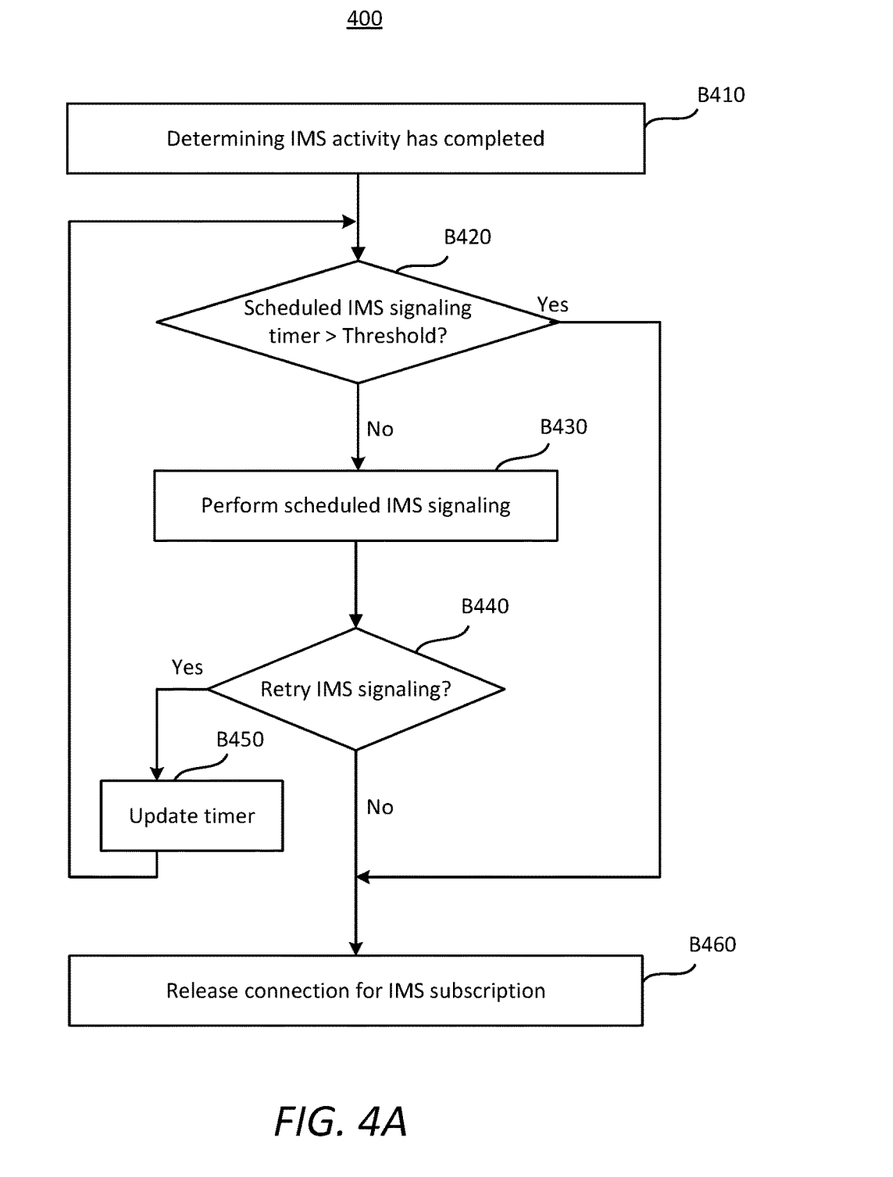
FIG. 4A is a process flowchart diagram illustrating a method for preponing a scheduled IMS activity according to various examples.

FIG. 4A is a process flowchart diagram illustrating a method 400 for preponing scheduled IMS activities according to various examples. Referring to FIGS. 1-4A, one or more of blocks B410-B460 may correspond to one of blocks B310-B340.

At block B410, the IMS module 230 or the general-purpose processor 206 may determine that an IMS activity at the IMS subscription has completed. As discussed with reference to block B310 of FIG. 3, the IMS module 230 or the general-purpose processor 206 may determine that the IMS activity has completed upon transmitting and/or receiving a corresponding SIP messaging (e.g., a Bye request).

At block B420, the IMS module 230 or the general-purpose processor 206 may determine whether a timer for a scheduled IMS signaling exceeds a time threshold. As discussed with reference to block B320 of FIG. 3, the scheduled IMS signaling may include periodic Register Request, Keep Alive TCP probe packet, Subscribe request, Publish request, and any other IMS messages scheduled to be transmitted periodically. The IMS module 230 or the general-purpose processor 206 may maintain a timer for the schedule IMS signaling in the memory 214 to indicate the time left for sending the scheduled IMS signaling. The time threshold may be a predefined value stored in the memory 214 and may be configured by a user. In some examples, the IMS module 230 or the general-purpose processor 206 may maintain multiple timers for various scheduled IMS signaling, and each of the timers may be compared with the time threshold.

In response to determining that the timer for the scheduled IMS signaling exceeds the time threshold (B420: Yes), the IMS module 203 or the general-purpose processor 206 may release the connection (e.g., RRC connection) at the IMS subscription, at block B460. As discussed with reference to block B340 of FIG. 3, the IMS module 203 or the general-purpose processor 206 may transmit a TAU request message the with a particular indicator (e.g., an activity flag) to indicate the completion of the IMS activity and to trigger the transfer to idle mode. Or, the IMS module 203 or the general-purpose processor 206 may release the connection by changing an internal state machine for the IMS subscription from the connected mode to the idle mode, without transmitting the TAU request message. After the connection of the IMS subscription is released, the RF resource 218 is available to perform activities of the DDS subscription.

In response to determining that the timer for the scheduled IMS signaling does not exceed the time threshold (B420: No), the IMS module 203 or the general-purpose processor 206 may perform the scheduled IMS signaling, at block B430. As discussed with reference to block B330 of FIG. 3, the IMS module 203 or the general-purpose processor 206 may send the scheduled IMS signaling (e.g., a Register request, Keep Alive TCP probe packet, Subscribe request, Publish request) pending within a time period shorter than or the same as the time threshold.

After the scheduled IMS signaling is performed at block B430, the IMS module 203 or the general-purpose processor 206 may determine whether to retry the scheduled IMS signaling, at block B440. Occasionally, the IMS subscription may fail in an attempt to perform the scheduled IMS signaling. The failure event includes receiving an error message from the network or receiving no response. For example, if the IMS network 106 accepts Register request of the wireless communication device 200, the wireless communication device 200 may receive an ACK message acknowledging the registration. If the Register request fails, the wireless communication device 200 may receive no response. As another example, if the Publish/Subscribe request for capability polling of contacts fails, the wireless communication device may either receive the error code 503/500/603 or receive no response. Accordingly, the IMS module 203 or the general-purpose processor may determine to retry the scheduled IMS signaling if the failure event is detected, while not to retry if the scheduled IMS signaling has been successfully performed.

In response to determining not to retry the scheduled IMS signaling (B440: No), the IMS module 203 or the general-purpose processor 206 may locally release the connection for the IMS subscription, at block B460, as discussed above. In various examples, the timer may be reset and triggered for a next IMS signaling.

In response to determining to retry the scheduled IMS signaling (B440: Yes), the IMS module 203 or the general-purpose processor 206 may update the timer for retrying the scheduled IMS signaling, at block B450. The wireless communication device 200 may wait a period of time before retrying the scheduled IMS signaling. The time duration until retry of the scheduled IMS signaling may be used to update the timer.

Various types of IMS signaling may have various retry mechanism. In some examples, the wireless communication device 200 is configured to follow a predefined waiting pattern in response to receiving no response from the network. In some examples, the predefined waiting pattern may depend on the network or network carrier associated with the IMS subscription. The predefined waiting pattern may include set intervals for waiting before retrying the failed activity. For example, the wireless communication device may be configured to transmit re-requests at time intervals that double after every re-request until a timer (e.g., Treg timer) expires.

Figure 4B:
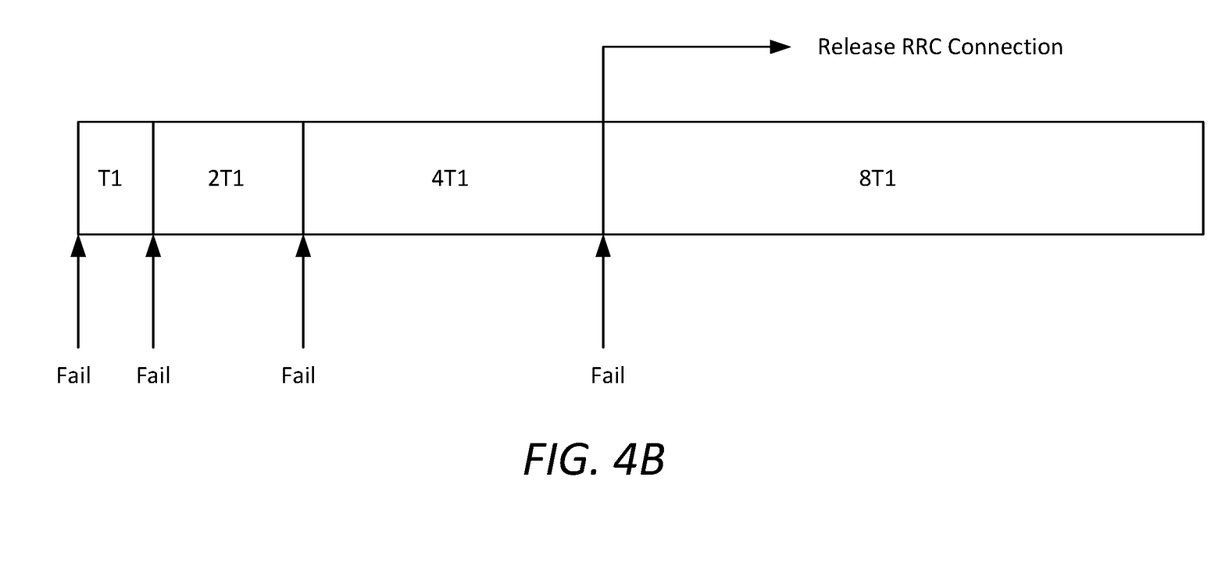
FIG. 4B is a schematic diagram of a waiting pattern for retrying a scheduled IMS activity in accordance with various examples.

FIG. 4B is a schematic diagram of a waiting pattern for retrying the scheduled IMS signaling in accordance with various examples. In FIG. 4B, if the Register request fails, the wireless communication device 200 may retransmit the Register request following a pattern of T1, 2T1, 4T1, 8T1, T2, T2, before Treg timer timeout (e.g., T1=2 seconds, T2=16 Seconds, Treg=16 seconds). That is to say, if the Register request fails for the first time, the wireless communication device 200 waits two seconds before retransmitting the request. If the request fails for the second time, the wireless communication device 200 waits four seconds before retransmitting the request, then again after 8 seconds, then again after 16 seconds, and so on. In some examples, this waiting pattern occurs until expiry of a timer (e.g., Treg timer). As another example, the wireless communication device 200 may perform an exponential retry pattern for failed Auto Configuration Transitions (ACD) (e.g., a first retry after waiting 30 seconds, a second retry after waiting 2 minutes, a third retry after waiting 5 minutes, and so on). It should be understood that the example of FIG. 4B is described for illustration not for limitation; any other suitable waiting pattern may be utilized at the wireless communication device.

In some examples, the retry mechanism may vary depending on the type of the failure event. For example, in response to attempting the first Subscribe/Publish request for capability polling of contacts, the wireless communication device 200 may receive an error message (e.g., error code 503/500/603) from the network. The error message may include a Retry-After header field directing how much time the wireless communication device should wait before automatically reattempting the first activity. In some examples, in response to receiving the error message, the wireless communication device 200 is configured with an exponential retry pattern. For example, the wireless communication device 200 may perform subsequent reattempts of Subscribe/Publish request at exponential time intervals (e.g., a first retry after waiting 1 minute, a second retry after waiting 2 minutes, a third retry after waiting 4 minutes, and so on). If the failure event is receiving no response for Subscribe/Publish request from the network, the wireless communication device 200 may follow a predefined waiting pattern (e.g., a first retry after waiting 3 seconds, a second retry after waiting 6 seconds, a third retry after waiting 12 seconds until a timer expires) first. After the predefined waiting pattern is consumed, the wireless communication device may then perform the retry pattern configured by the network, as discussed above.

After the timer is updated at B450, the method 400 may return to block B420 to determine whether the updated timer exceeds the time threshold and operates onward as described above with reference to blocks B430-B460. If the reattempts keep failing, the method 400 will keep retrying the scheduled IMS signaling until the updated timer exceeds the time threshold. As shown in FIG. 4B, after four failed attempts (one initial attempt and three reattempts), the timer for the scheduled Register request increases to 16 seconds, exceeding the predefined time threshold (e.g., 10 seconds). Thus, the method 400 proceeds to block B460 to release the connection, as discussed above. When the wireless communication device 200 is waiting to retry the scheduled IMS signaling, VoLTE call, SMS delivery, and other IMS activities are available at the IMS subscription. Therefore, retrying the scheduled IMS signaling within the short interval (e.g., a few seconds) does not harm the functionality of the IMS subscription.

Figure 5:
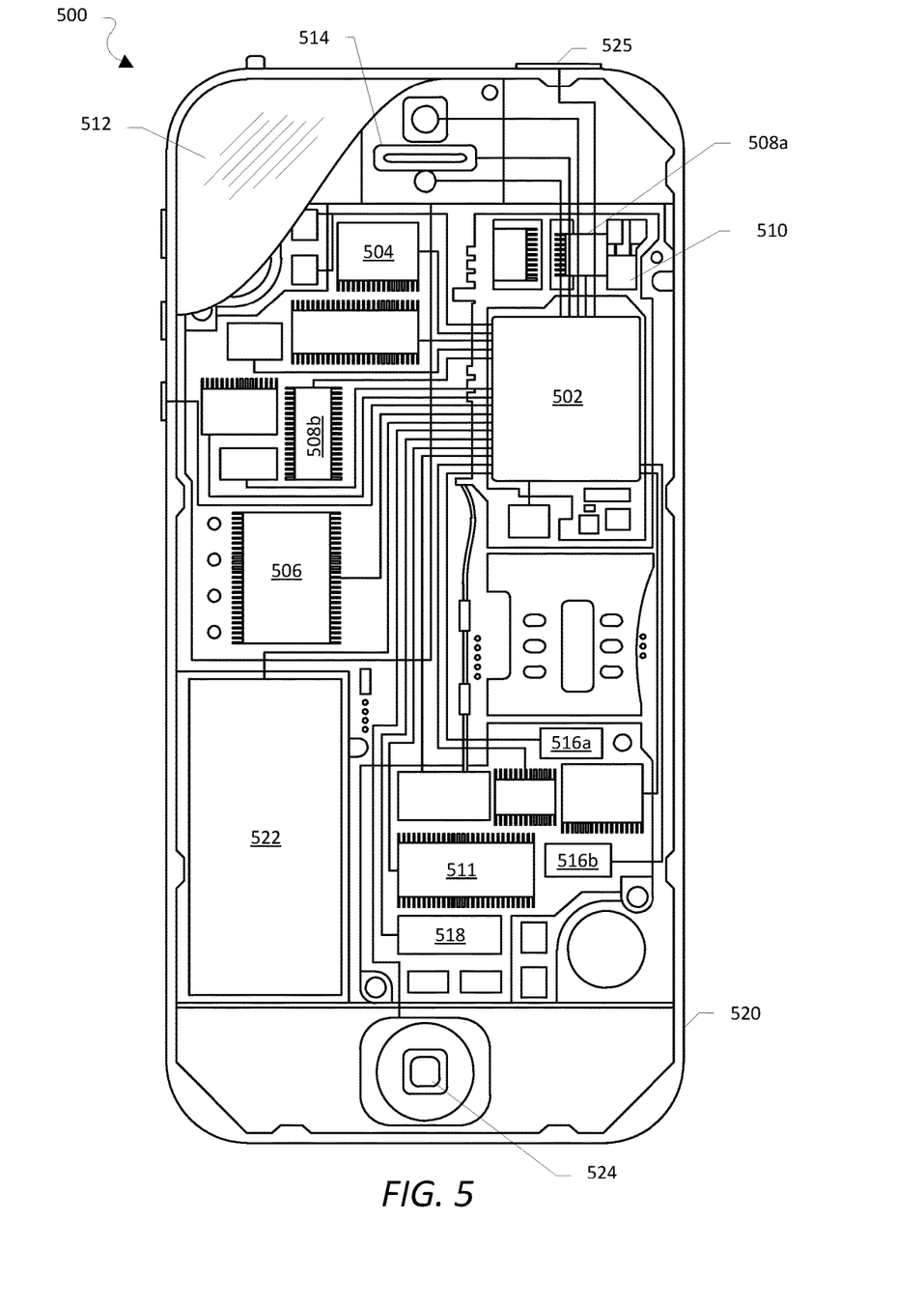
FIG. 5 is a component block diagram of a wireless communication device suitable for use with various examples.

The various examples may be implemented in any of a variety of wireless communication devices 110 and 200, an example of which is illustrated in FIG. 5, as wireless communication device 500. As such, the wireless communication device 500 may implement the process and/or the apparatus of FIGS. 1-4, as described herein.

With reference to FIGS. 1-5, the wireless communication device 500 may include a processor 502 coupled to a touchscreen controller 504 and an internal memory 506. The processor 502 may be one or more multi-core integrated circuits designated for general or specific processing tasks. The memory 506 may be volatile or non-volatile memory, and may also be secure and/or encrypted memory, or unsecure and/or unencrypted memory, or any combination thereof. The touchscreen controller 504 and the processor 502 may also be coupled to a touchscreen panel 512, such as a resistive-sensing touchscreen, capacitive-sensing touchscreen, infrared sensing touchscreen, etc. Additionally, the display of the wireless communication device 500 need not have touch screen capability.

The wireless communication device 500 may have one or more cellular network transceivers 508a, 508b coupled to the processor 502 and to at least one antenna 510 and adapted for sending and receiving cellular communications. The transceivers 508a, 508b and antenna 510 may be used with the above-mentioned circuitry to implement the various example methods. The cellular network transceivers 508a, 508b may be the RF resource 218. The antenna 510 may be the antenna 220. The wireless communication device 500 may include two or more SIM cards 516a, 516b, corresponding to the first SIM 204a and the second SIM 204b, coupled to the transceivers 508a, 508b and/or the processor 502. The wireless communication device 500 may include a cellular network wireless modem chip 511 (e.g., the baseband modem processor 216) that enables communication via at least one cellular network and is coupled to the processor 502.

The wireless communication device 500 may include a peripheral device connection interface 518 coupled to the processor 502. The peripheral device connection interface 518 may be singularly adapted to accept one type of connection, or multiply adapted to accept various types of physical and communication connections, common or proprietary, such as USB, FireWire, Thunderbolt, or PCIe. The peripheral device connection interface 518 may also be coupled to a similarly adapted peripheral device connection port (not shown).

The wireless communication device 500 may also include speakers 514 for providing audio outputs. The wireless communication device 500 may also include a housing 520, constructed of a plastic, metal, or a combination of materials, for containing all or some of the components discussed herein. The wireless communication device 500 may include a power source 522 coupled to the processor 502, such as a disposable or rechargeable battery. The rechargeable battery may also be coupled to a peripheral device connection port (not shown) to receive a charging current from a source external to the wireless communication device 500. The wireless communication device 500 may also include a physical button 524 for receiving user inputs. The wireless communication device 500 may also include a power button 526 for turning the wireless communication device 500 on and off.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A method for a wireless communication device having multiple Subscriber Identity Modules (SIMs) in which a first SIM is associated with an Internet Protocol (IP) Multimedia Subsystem (IMS) subscription that supports IMS services, the method comprising:
   determining that an IMS activity has completed at the IMS subscription;
   determining whether a timer for a scheduled IMS signaling exceeds a time threshold, wherein the timer indicates a time left for performing the scheduled IMS signaling as scheduled; and
   in response to determining that the timer does not exceed the time threshold, performing the scheduled IMS signaling and releasing a connection for the IMS subscription.

2. The method of claim 1, further comprising: in response to determining that the timer exceeds the time threshold, releasing the connection for the IMS subscription.

3. The method of claim 1, wherein the IMS activity includes at least one of Rich Communication Service (RCS), Short Message Service (SMS), or Voice over Long-Term Evolution (VoLTE).

4. The method of claim 1, wherein the IMS activity is determined to have completed in response to transmitting or receiving an IMS message that terminates the IMS activity.

5. The method of claim 1, wherein the time threshold is a predefined value.

6. The method of claim 1, wherein the scheduled IMS signaling includes at least one of a Register request, Keep Alive Transport Control Protocol (TCP) packet, Subscribe Request, or Publish Request, that is scheduled to be transmitted periodically.

7. The method of claim 1, wherein releasing the connection includes:
   transmitting a tracking area update (TAU) request to indicate completion of the IMS activity; and
   triggering the IMS subscription to transfer from a connected mode to an idle mode.

8. The method of claim 1, wherein releasing the connection includes changing an internal state machine for the IMS subscription from a connected mode to an idle mode.

9. The method of claim 1, wherein a second SIM of the wireless communication device is associated with a subscription designated for data services (DDS).

10. A method for a wireless communication device having multiple Subscriber Identity Modules (SIMs) in which a first SIM is associated with an Internet Protocol (IP) Multimedia Subsystem (IMS) subscription that supports IMS services, the method comprising:
    determining that an IMS activity has completed at the IMS subscription;
    determining whether a timer for a scheduled IMS signaling exceeds a time threshold, wherein the timer indicates a time left for performing the scheduled IMS signaling as scheduled;
    in response to determining that the timer does not exceed the time threshold, performing the scheduled IMS signaling;
    determining whether to retry the scheduled IMS signaling; and
    in response to determining to retry the scheduled IMS signaling, updating the timer.

11. The method of claim 10, further comprising in response to determining not to retry the scheduled IMS signaling, releasing a connection for the IMS subscription.

12. The method of claim 10, further comprising: in response to determining that the timer exceeds the time threshold, releasing a connection for the IMS subscription.

13. The method of claim 10, wherein determining to retry the scheduled IMS signaling is in response to detecting a failure event in which an error message is received or no message is received responsive to the scheduled IMS signaling.

14. The method of claim 10, wherein updating the timer includes updating the timer according to a predefined waiting pattern that includes set intervals for waiting before retrying the scheduled IMS signaling.

15. The method of claim 10, wherein updating the timer includes:
    updating the timer according to a first waiting pattern in response to detecting a first type of failure event in which an error message is received responsive to the scheduled IMS signaling; and
    updating the timer according to a second waiting pattern in response to detecting a second type of failure event in which no message is received responsive to the scheduled IMS signaling.

16. A wireless communication device, comprising:
    multiple Subscriber Identity Modules (SIMs) in which a first SIM is associated with an Internet Protocol (IP) Multimedia Subsystem (IMS) subscription that supports IMS services;
    a memory configured to store a time threshold and to maintain a timer for a scheduled IMS signaling, wherein the timer indicates a time left for performing the scheduled IMS signaling as scheduled;
    a processor coupled to the multiple SIMs and the memory, the processor configured to:
        determine that an IMS activity has completed at the IMS subscription;
        determine whether the timer for the scheduled IMS signaling exceeds the time threshold; and
        in response to determining that the timer does not exceed the time threshold, perform the scheduled IMS signaling.

17. The wireless communication device of claim 16, wherein the IMS activity includes at least one of Rich Communication Service (RCS), Short Message Service (SMS), or Voice over Long-Term Evolution (VoLTE).

18. The wireless communication device of claim 16, wherein the processor is configured to determine that the IMS activity has completed in response to transmitting or receiving an IMS message that terminates the IMS activity.

19. The wireless communication device of claim 16, wherein the time threshold is a predefined value.

20. The wireless communication device of claim 16, wherein the scheduled IMS signaling includes at least one of a Register request, Keep Alive Transport Control Protocol (TCP) packet, Subscribe Request, or Publish Request, that is scheduled to be transmitted periodically.

21. The wireless communication device of claim 16, further comprising a second SIM associated with a subscription designated for data services (DDS).

22. The wireless communication device of claim 16, wherein the processor is further configured to release a connection for the IMS subscription after performing the scheduled IMS signaling.

23. The wireless communication device of claim 22, wherein the processor is further configured to:
- transmit a tracking area update (TAU) request to indicate completion of the IMS activity; and
- trigger the IMS subscription to transfer from a connected mode to an idle mode.

24. The wireless communication device of 16, wherein the processor is further configured to:
- determine whether to retry the scheduled IMS signaling; and
- in response to determining to retry the scheduled IMS signaling, update the timer.

25. The wireless communication device of claim 24, wherein the processor is further configured to release a connection for the IMS subscription in response to determining not to retry the scheduled IMS signaling.

26. The wireless communication device of claim 24, wherein the processor is further configured to determine to retry the scheduled IMS signaling in response to detecting a failure event in which an error message is received or no message is received responsive to the scheduled IMS signaling.

27. The wireless communication device of claim 24, wherein the processor is further configured to update the timer according to a predefined waiting pattern that includes set intervals for waiting before retrying the scheduled IMS signaling.

28. The wireless communication device of claim 24, wherein the processor is further configured to:
- update the timer according to a first waiting pattern in response to detecting a first type of failure event in which an error message is received responsive to the scheduled IMS signaling; and
- update the timer according to a second waiting pattern in response to detecting a second type of failure event in which no message is received responsive to the scheduled IMS signaling.

29. The non-transitory computer-readable medium of claim 24, wherein the method further comprises: in response to determining that the timer exceeds the time threshold, releasing the connection for the IMS subscription.

30. A non-transitory computer-readable medium having processor-readable instruction such that, when executed, causes a processor to perform a method for a wireless communication device having multiple Subscriber Identity Modules (SIMs) in which a first SIM is associated with an Internet Protocol (IP) Multimedia Subsystem (IMS) subscription that supports IMS services, the method comprising:
- determining that an IMS activity has completed at the IMS subscription;
- determining whether a timer for a scheduled IMS signaling exceeds a time threshold, wherein the timer indicates a time left for performing the scheduled IMS signaling as scheduled; and
- in response to determining that the timer does not exceed the time threshold, performing the scheduled IMS signaling and releasing a connection for the IMS subscription.

\* \* \* \* \*